No. 849,215. PATENTED APR. 2, 1907.
M. DAVIS.
GRAIN WEIGHING MACHINE.
APPLICATION FILED JULY 13, 1906.

4 SHEETS—SHEET 1.

Witnesses
Frank R. Glore.
H. C. Rodgers

Inventor
Monroe Davis
By George H. Thorpe
Atty

No. 849,215. PATENTED APR. 2, 1907.
M. DAVIS.
GRAIN WEIGHING MACHINE.
APPLICATION FILED JULY 13, 1906.

4 SHEETS—SHEET 3.

Fig. 3.

Witnesses
Frank R. Glore.
H. C. Rodgers

Inventor
Monroe Davis
By George W. Thorpe Atty.

No. 849,215. PATENTED APR. 2, 1907.
M. DAVIS.
GRAIN WEIGHING MACHINE.
APPLICATION FILED JULY 13, 1906.
4 SHEETS—SHEET 4.
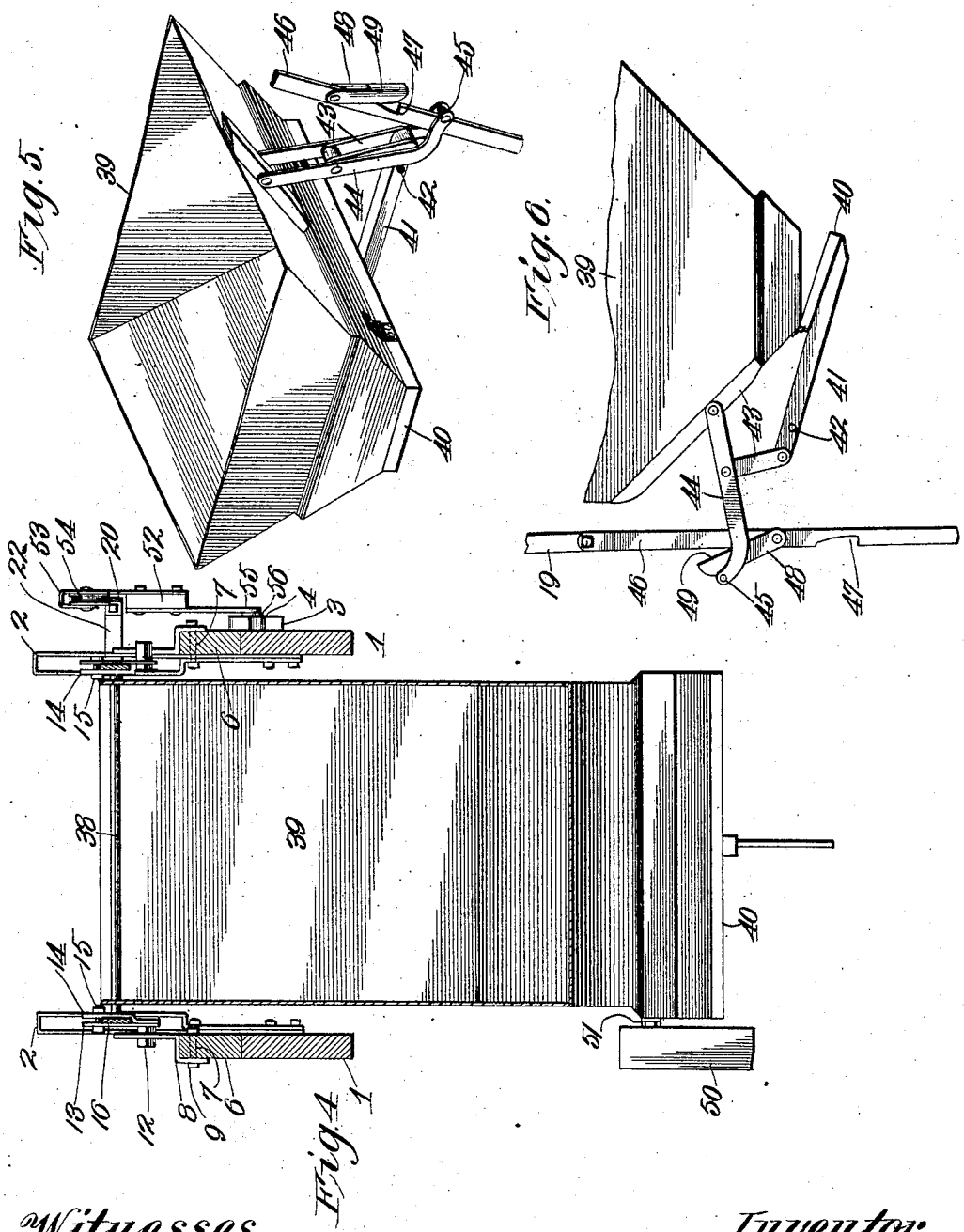
Witnesses
Frank R. Glore
H. C. Rodgers
Inventor
Monroe Davis
By George H. Thorp
Atty.

UNITED STATES PATENT OFFICE.

MONROE DAVIS, OF BILLINGS, OKLAHOMA TERRITORY, ASSIGNOR OF ONE-HALF TO O. W. HUTCHINSON, OF BILLINGS, OKLAHOMA TERRITORY.

GRAIN-WEIGHING MACHINE.

No. 849,215.     Specification of Letters Patent.     Patented April 2, 1907.

Application filed July 13, 1906. Serial No. 326,024.

*To all whom it may concern:*

Be it known that I, MONROE DAVIS, a citizen of the United States, residing at Billings, in the county of Noble and Territory of Oklahoma, have invented certain new and useful Improvements in Grain-Weighing Machines, of which the following is a specification.

This invention relates to automatic weighing-machines, and more especially to that class comprising a pair of boxes adapted to alternately receive and discharge grain without interrupting its flow from the point of supply to the boxes, my object being to produce a machine of this character which operates efficiently and reliably.

A further object is to produce a machine of this character having two bearings which alternately form the fulcrums in the weighing operations to facilitate and render such operations more accurate.

A still further object is to provide a traveling weight to coöperate in effecting the quick and accurate weighing of the grain and to effect the deflection of the same into said boxes alternately.

With these objects in view and others, as hereinafter appear, the invention consists in certain novel and peculiar features of construction and organization, as hereinafter described and claimed, and in order that it may be fully understood reference is to be had to the accompanying drawings, in which—

Figure 1:
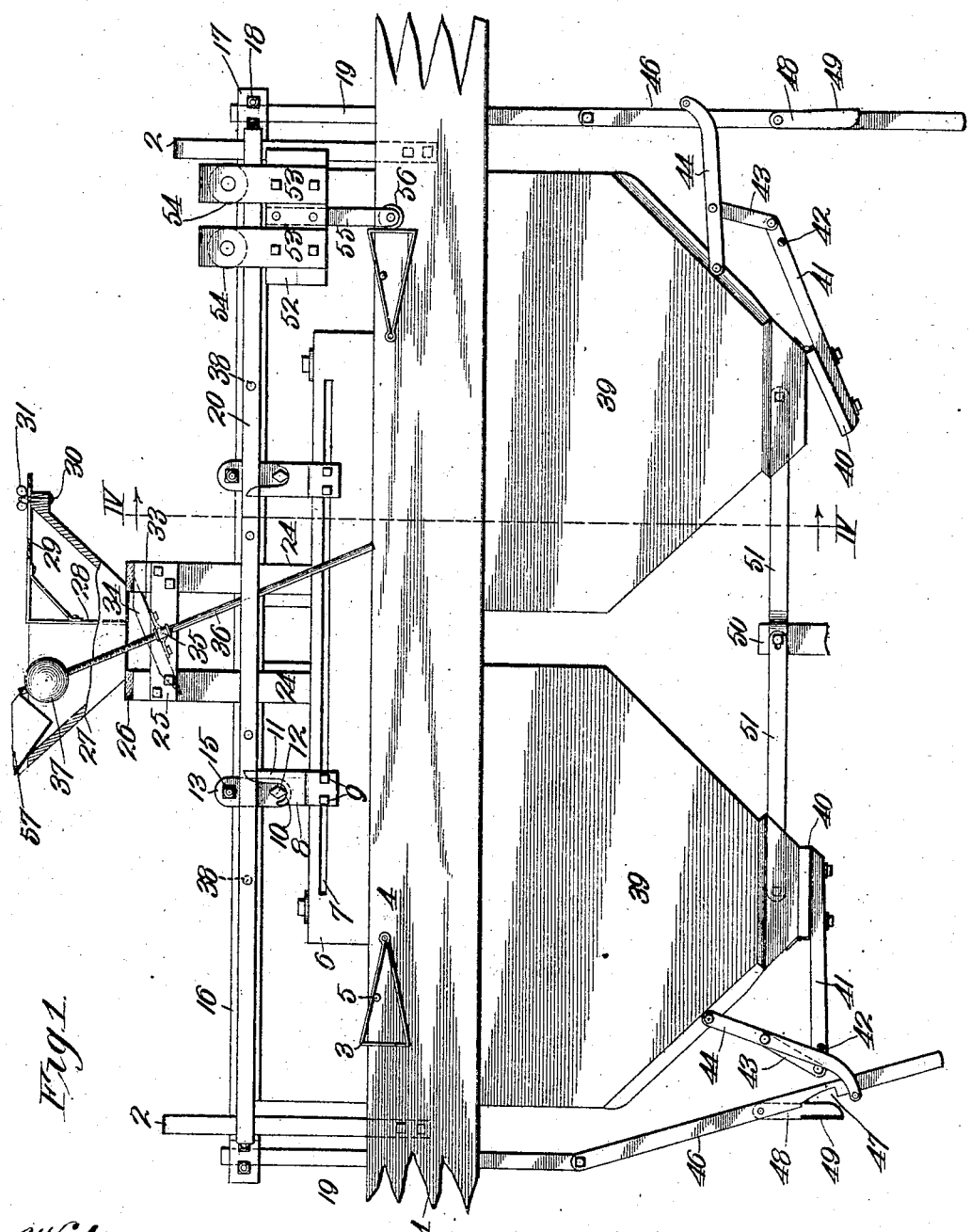
Figure 2:
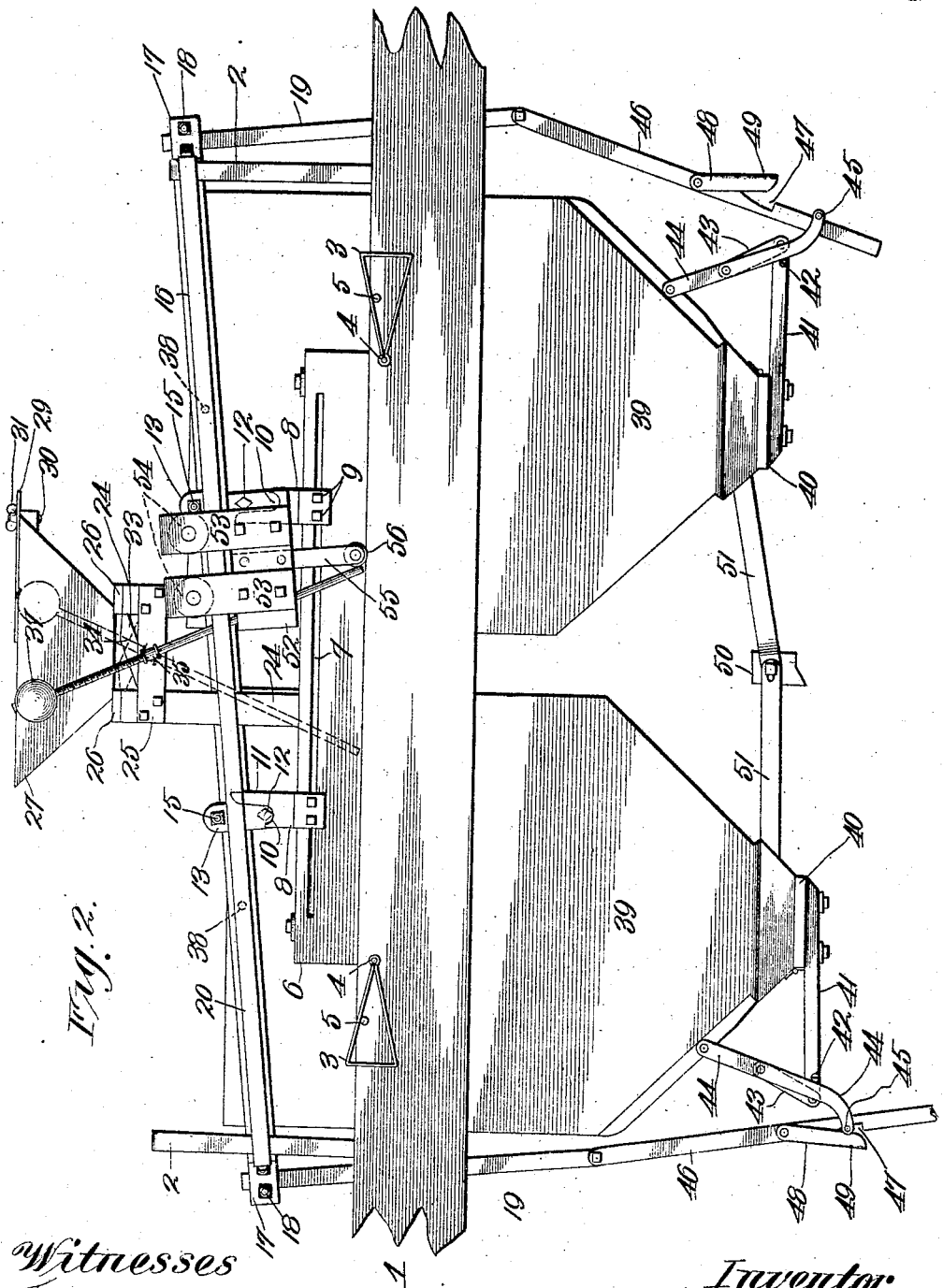

Figure 1 is a side elevation, partly in section, of a weighing-machine embodying my invention. Fig. 2 is a side view with the operative parts occupying a changed relation from that shown in Fig. 1. Fig. 3 is a top plan view with the parts in the position shown by Fig. 1. Fig. 4 is a section on the line IV IV of Fig. 1. Fig. 5 is a sectional perspective view of the lower portion of one of the boxes. Fig. 6 is a side view of the lower portion of one of the boxes.

In the said drawings, where like reference characters refer to corresponding parts, 1 indicates a pair of cross-timbers of an elevator or other support, and 2 upright slotted standards or guides secured rigidly to said timbers or support. 3 indicates a pair of abutments, preferably of triangular form and pivoted at 4 to the outer side or face of one of the timbers, stop-pins 5 projecting from the timber to limit the downward pivotal movement of said abutments.

6 indicate bars secured rigidly upon timbers 1 and provided with longitudinal slots 7.

8 are bearing-brackets engaging the upper edges and outer sides of bars 6, and 9 clamping-bolts carried by said brackets and extending through said slots to clamp the brackets at the desired points of adjustment. The brackets are provided with upwardly-disposed concave bearing-cavities 10 and are provided at the inner sides of said bearing-cavities with upwardly-projecting guard-arms 11.

12 indicate knife-bearings projecting outward from the lower ends of rigid hangers comprising plates 13 and 14, clamped firmly by bolts 15 against the outer and inner faces, respectively, of one side of a rectangular rocking frame or beam 16, said beam preferably consisting of two similar sections terminating at their ends in outwardly-projecting arms 17, bolted together, as at 18, the sides of the rectangular beam or frame extending through the slotted uprights or standards 2, so as to be limited in the tilting or rocking movements by said standards.

19 indicates bars forming depending arms for the ends of the beam, the upper ends of said bars being clamped rigidly between arms 17 by the bolts 18, whereby the sections are secured together.

20 indicates a track-rail disposed, preferably, parallel with the rocking beam or frame and secured to the latter, the preferred connection being to provide the track-rail with arms 21, bolted to the opposite ends of the beam or frame, the connection being made more rigid by braces 22 and 23.

24 indicates vertical standards secured rigidly in any suitable manner to bars 6 and connected near their upper ends by bars 25 and 26, and secured upon and bridging the space between bars 26 is a hopper 27.

28 indicates a partition extending from one side of the hopper to the other and provided with a horizontal longitudinally-slotted arm 29, bridging the space between the partition and one of the inclined walls of the hopper. A bolt 30, carried by the hopper, extends through said slot and is engaged by a wing-nut 31, whereby the partition can be clamped at the desired point of adjustment in the hopper.

32 indicates a transverse rock-shaft journaled at its ends in bars 25, and rigidly mounted on said shaft and underlying the hopper is a tilting pan 33, provided with upwardly-projecting end flanges 34, the latter serving to prevent any of the grain which falls upon the tilting pan from escaping over the ends of the same.

35 indicates a T-coupling forming a head for one end of rock-shaft 32, and 36 a lever extending through and rigidly secured to said coupling and provided above the latter with an adjustable weight 37, said weight being adapted to screw upward or downward on the lever to increase or diminish the resistance offered by the latter to rocking movement, said lever preferably extending down through the space between the track-rail 20 and the corresponding side of the rocking beam or frame and outward of the plane of the timbers or support 1.

38 indicates cross-rods journaled in the sides of the rock beam or frame at equal distances from and at opposite sides of its center, said rods forming pivoted suspending means for the grain boxes or receptacles 39, which have their lower ends tapered or converging to form narrow transverse discharge-openings of small capacity as compared with the open upper or receiving ends of the boxes.

40 indicates hinged valves or gates to form closures for the openings at the lower ends of the boxes, provided with outwardly-projecting arms 41, having stops 42 near their outer ends and outward of said stops pivoted to and between the parallel links 43, pivotally connected to and arranged between the parallel arms forming swing-frames 44, pivotally suspended from the boxes 39, said links and frames constituting a toggle connection between the boxes and their respective valves or gates. The lower ends of frames 44 curve outward, and their arms are connected at their lower extremity by cross-pins 45, and extending loosely through said swing-frames are swing-bars 46, pivoted at their upper ends to the lower ends of the rigid arms 19 of the rocking beam or frame. The swing-bars 46 are provided with notches 47 in their outer edges, and pivoted to said bars above the notches are bifurcated guards 48, the cross or bridging pieces 49 of said guards being adapted at times to enter said notches for a purpose which hereinafter appears.

50 indicates a part bearing a rigid relation to the support 1, and pivotally connecting said part 50 with the lower ends of the boxes are links 51, the pivotal movement of the links being so slight as compared with their length that the swinging movement which they impart to the boxes as the latter rise and fall is not noticeable, said links being simply provided to guard against undesirable movement of the boxes toward or from each other while the weighing operations are in progress.

A traveling weight to facilitate the tilting action of the rocking frame or beam, and thereby render the weighing operation more accurate, comprises a weight 52, provided with hangers 53, equipped with grooved rollers 54, engaging track-rail 20, and said weight is provided with a depending arm 55, equipped with a roller 56 to operate in conjunction with the pivoted abutments 3.

In operation the bearings form alternately the fulcrums and in the interim a joint support for the boxes, as shown in Fig. 1, in which figure the valve or gate of one box is open and the other closed, the closed box at such time being charged or loaded. The boxes also occupy the same position when both are empty, though in this case both valves or gates would be closed.

Assuming that the machine is in operation and is in the position shown by Fig. 1, it is to be understood that the left-hand box has received sufficient grain to cause it to descend and cause the right-hand box to ascend to the position of rest—that is, with the bearings forming a joint support for the boxes. It is to be understood also that as the previously-charged or right-hand box started upward the toggle between the valve and box was broken and the pressure of the grain caused the valve to open by preponderance of weight and permit the grain to escape, which escape continues until the box is emptied, the major portion escaping after the box has been raised to the position of rest, because the upward movement is very quick. As soon as the box is emptied the valve automatically closes by gravity or preponderance of weight outward of its hinge-point. During this period the left-hand box is filling, this action continuing until some time after the right-hand box is emptied and its valve is closed. When the predetermined weight of grain is imposed on the left-hand box, the weight is transferred from both bearings to the left-hand bearing, and in consequence the left-hand or charged box descends and the right-hand or empty box rises to the positions respectively shown in Fig. 2. As the rocking beam or frame partakes of the movement described the weight is raised until its roller 56 passes above the plane of the right-hand abutment, and as a result the weight starts down the inclined track-rail and acquires sufficient momentum in such passage or travel to operate the shift-lever from the position shown in full to the position shown in dotted lines, Fig. 2, the roller 56 striking the lower end of the lever to effect such shift and cause the grain to pass into the right-hand box. The travel of the weight continues until arrested by the depressed end of the rocking beam or frame, and in such passage roller 56 passes under and beyond the left-hand abutment, it being noted in this connection that the slotted standards at the right-hand end of the machine limit the rocking or tilting movement of the rocking beam or frame, and consequently the rise and fall of the boxes.

The parts remain in the positions described until sufficient grain has entered the elevated or right-hand box to counterbalance the fully charged or depressed box, when the latter rises and the former descends until the weight of both is imposed on both bearings at the point of rest and the roller 56 is raised to the plane of the adjacent abutment and is prevented thereby from travel toward the other abutment. During the rise of the left-hand and the descent of the right-hand box to the point of rest the toggle between the former and its valve is broken (as before explained with reference to the right-hand box) and the grain begins to escape and continues to flow until the box is emptied, when the valve recloses automatically. The flow of grain into the right-hand box continues until the predetermined weight is imposed thereon and the emptied or left-hand box is overbalanced, this resulting in a transfer of the weight onto the right-hand bearing when the parts occupy a position the reverse of that shown in Fig. 2, the weight traveling downward to the right on the track-rail and in such passage causing the shift-lever to resume its original position and the tilting pan to deflect the grain from the spout into the left-hand box. The grain continues to flow into the left-hand box until sufficient enters to overbalance the fully-charged box and raise it to the point of rest, as shown in Fig. 1, it being noted that the partially-filled box accomplishes this result because it has the advantage of a long leverage on the other box, as hereinbefore explained in connection with the corresponding action of the other box, it being also understood that the valve of the right-hand box starts to open as it rises.

The above description of the operation leaves the parts in their initial positions, and further description of the general operation would be repetition.

In the rocking operation of the rocking beam or frame the descending box being closer to the fulcrum-point than the corresponding end of the beam or frame imparts to its rock-frame 44 a shorter downward movement than is imparted by the frame to swing-bar 46, and as a consequence the said rock-frame 44 when the rocking movement of the beam is completed occupies the relative position with respect to the swing-bar 46 that is shown in Fig. 2—that is to say, cross-pin 45 of said rock-frame has, in effect, moved upwardly between the notched portion of bar 46 and its pivotally-pendent guard 48. Now as the rock-beam again is reversed and reëlevates the depressed box the latter moves upward more slowly than the corresponding end of said beam, and as a result the shoulder at the lower end of the notch of bar 46 comes into engagement with and presses upwardly and outward on cross-pin 45 of said rock-frame 44 and rocks the same outwardly on its pivotal point of connection with the box, and thereby breaks the toggle constituted by links 43 and the upper part of the said rock-frame, as hereinbefore explained, by moving the pivotal point of connection between said link and rock-frame outward beyond the plane occupied by the pivotal point of connection of the opposite ends of the toggle with the box and the arm of its valve. As this action takes place the weight of the grain opens the valve and swings it and its connected parts from the position shown at the left-hand side of Fig. 2 to the position shown in Fig. 6, in which action it will be noticed that the cross-pin of the rock-frame swings the guard upwardly, the opening movement of the valve continuing until the cross-pin of its rock-frame swings clear over and beyond the guard, when the latter gravitates back to its original or pendent position. The valve and its connected parts remain in this position as long as the grain is escaping, and then it recloses automatically, because the preponderating weight is outward of the hinge-point, the rock-frame under the closing action of the valve swinging downward past the pivotally-pendent guard to the position shown at the left-hand side of Fig. 1.

It will be understood that because the valve is tripped when the box is rising, and consequently after it has been weighed and before the other box has been weighed, that there is no resistance offered by the tripping action to the weighing operation and that consequently the weighing operation is more accurate than if the valve had to be tripped in the descending or weighing operation of the box, as in such action the extra resistance of the tripping action would have to be taken into consideration. In brief, by tripping the valve when the box is rising a surplus power is utilized. The same thing is true of the traveling weight—that is to say, the traveling weight operates the shift-lever and its tilting pan after each weighing operation has been performed and before the companion box is weighed, and consequently none of the power used in the weighing operation is employed in reversing the position of the tilting pan. As far as I am aware there is no grain-weighing machine or apparatus on the market which trips the valve of each box and reverses the position of the tilting pan in the interim between weighing operations. The specific gravity of the traveling weight is of course taken into consideration in the weighing operation, as it coöperates with the empty box in resisting downward movement of the loaded box beyond the point of rest and then travels to the depressed end of the frame and coöperates with the loaded box in resisting downward movement of the other box to the position of rest, it being remembered that the partially-loaded box starts to elevate the fully-loaded box because of the great advantage of leverage possessed—that is, because the partially-loaded box is relatively a much greater distance from the fulcrum-point than the loaded box and the traveling weight.

It will be noted that the empty box because of its invariable advantage of leverage over the loaded one acts as and in reality is a weight and that grain can be accurately weighed in the boxes without employing the traveling weight or an equivalent thereof, though of course in such event the means employed to operate the shift-lever if automatic would be operated while the weighing operation was in progress, and therefore would have to be taken into account in the weighing operation.

The arms 11 of the bearing-brackets serve as a guide for the movement of the knife-bearings 12 as they alternately rise above and return to their seats or bearing-cavities 10.

This machine can be adjusted to weigh different quantities of grain by the adjustment of the bearings upon bars 6 and the rock beam or frame 16, the adjustment being outward for increased and inward for diminished weights. The adjustment of the bearings to permit different quantities of grain to be weighed in the boxes distinguishes the machine clearly from the ordinary type, in which the poise is shifted or variable weights employed for the same purpose.

The grain is supplied to the hopper through an elevator-spout 57 or its equivalent, and the partition 28 is made adjustable to accommodate different characters or conditions of grain or differences of speed with which it is desired to supply the hopper—that is to say, the partition 28 is so adjusted that the impact of the grain on the tiltable pan shall be imposed about centrally of the pan, so as to avoid any possibility of the position of said pan being reversed under such impact and discharging the grain into the wrong box. The boxes of course discharge into a chute (not shown) leading to a car to be loaded or into any other suitable receptacle.

From the above description it will be apparent that I have produced a weighing-machine possessing the features of advantage enumerated as desirable in the statement of the object of the invention, and I wish it to be understood that I do not desire to be restricted to the exact details of construction shown and described, as obvious modifications will suggest themselves to one skilled in the art.

Having thus described the invention, what I claim as new, and desire to secure by Letters Patent, is—

1. In a grain-weighing machine, a rocking beam, a pair of bearings to jointly support the beam and alternately form bearings therefor, and a pair of boxes pivotally suspended from the beam outward of said bearings.

2. In a grain-weighing machine, a rocking beam, a pair of bearings to jointly support the beam and alternately form bearings therefor, a pair of boxes pivotally suspended from the beam outward of said bearings, a hopper, a tiltable pan below the same, and means to automatically tilt said pan and cause the grain from the hopper to alternately fill said boxes.

3. In a grain-weighing machine, a rocking beam, a pair of bearings to jointly support the beam and alternately form bearings therefor, a pair of boxes pivotally suspended from the beam outward of said bearings, a hopper, a tiltable pan below the same, and a traveling weight to automatically change its position after one box has been weighed and incidentally reverse the position of the tilting pan and cause the grain from the hopper to pass into the other or empty box.

4. In a grain-weighing machine, a rocking beam, a pair of bearings to jointly support the beam and alternately form bearings therefor, a pair of boxes pivotally suspended from the beam outward of said bearings, a hopper, a tiltable pan below the same, a pair of abutments outward of the bearings, a weight to move up and down with and longitudinally of the beam and adapted to be prevented from moving longitudinally by the abutment contiguous to the empty box until the opposite box has been weighed and raised the opposite end of the beam sufficiently high to lift the weight completely above the abutment.

5. In a weighing-machine, a suitable support, standards and abutments carried thereby, a rocking beam above the support and adapted to be limited in its rocking movements by said standards, a pair of bearing-brackets at opposite sides of and equal distances from the center of the beam and rigid with said supports, bearings rigid with and at opposite sides of and equal distances from the center of the beam, engaging said bearing-brackets simultaneously or alternately, boxes pivotally suspended from the beam outward of said bearings, a hopper above the boxes, a tilting pan below the hopper, a shift-lever to operate said pan and hold the same yieldingly tilted to discharge into one box or the other, and a weight movable upward with the beam and longitudinally thereof and adapted to be prevented by the adjacent abutment from the last-named movement until it is lifted above said abutment and in its longitudinal movement to operate the shift-lever and reverse the position of the tilting pan.

6. In a machine of the character described, a rocking beam, bearings at opposite sides of its center to alternately form the fulcrums of said beam, boxes pivotally suspended from the beam outward of said bearings, abutments outward of the suspension-points of the boxes, a longitudinal track-rail rigid with the beam, a traveling weight on said rail outward of the pivotal point of the box to be raised and having a part outward of the corresponding abutment, a tilting pan to discharge grain into the other box until the same overbalances the empty box and the weight and raises the latter until it clears said abutment, and a shift-lever connected to said tilting pan and adapted to be operated by the weight as it travels down the inclined track-rail after being raised above the abutment, the abutment-engaging part of the weight in such movement passing under and outward of the other abutment.

7. In a grain-weighing machine, a rocking beam, a pair of bearings to jointly support the beam and alternately form bearings therefor, a pair of boxes pivotally suspended from the beam outward of said bearings, and means to prevent undue swinging movement of the boxes as they rise and fall in the weighing operation.

8. In a grain-weighing machine, a rocking beam, a pair of bearings to jointly support the beam and alternately form bearings therefor, a pair of boxes pivotally suspended from the beam outward of said bearings, a rigid part, and links pivotally connecting said part with the boxes to prevent undue swinging movement of the latter in the weighing operations.

9. In a machine of the character described, a box having its lower end open, a hinged valve, a frame pivoted to the box, a link pivoted at its opposite ends to the valve and to said pivoted frame intermediate of its ends, a rocking beam from which the box is suspended, and a bar supported from the rocking beam at a greater distance from its fulcrum than the box and adapted as the beam rocks and raises the box to be also raised and engage the outer end of the pivoted frame and break the toggle composed of said frame and link, to permit the valve to open.

10. In a machine of the character described, a box having its lower end open, a hinged valve, a toggle between the box and valve to hold the latter closed over said opening, a bar having a shoulder engaging a part of the toggle, means to raise the box, and means to simultaneously but more rapidly raise said bar and cause it to break the toggle to permit the valve to be opened.

11. In a machine of the character described, a box having an opening in its lower end, a hinged valve having an arm projecting outward of the hinge-point, a preponderating weight on the valve comprising a hinged frame pivotally suspended from the box and provided with a cross-pin, a link pivotally connecting said arm with the valve-arm and forming in conjunction with said frame a toggle held normally locked by the preponderating weight, and means to swing said frame outward to break the toggle and permit the valve to be opened.

12. In a machine of the character described, a box having an opening in its lower end, a hinged valve having an arm projecting outward of the hinge-point, a preponderating weight on the valve comprising a hinged frame pivotally suspended from the box and provided with a cross-pin, a link pivotally connecting said arm with the valve-arm and forming in conjunction with said frame a toggle held normally locked by the preponderating weight, a pivoted bar having its outer edge engaged by said cross-pin and provided with a notch above the latter, and a guard to close said notch at times.

13. In a machine of the character described, a box having an opening in its lower end, a hinged valve having an arm projecting outward of the hinge-point, a preponderating weight on the valve comprising a hinged frame pivotally suspended from the box and provided with a cross-pin, a link pivotally connecting said arm with the valve-arm and forming in conjunction with said frame a toggle held normally locked by the preponderating weight, and a pivoted bar engaged by said cross-pin and caused by the latter to pitch downwardly and inwardly and provided above said pin with a notch in its outer edge and with a guard adapted to close said notch at times.

14. In a machine of the character described, a rocking beam, a box pivotally suspended therefrom, open at its lower end, a bar depending from the beam at a greater distance from its fulcrum than the box, a bar pivotally suspended from the depending bar to swing toward or from the box and provided with a notch and a pivoted guard to normally close the notch, a valve hinged at its outer edge to the box, and a preponderating weight on the valve outward of its hinge-point, comprising a swing-frame carried by the box and provided with a cross-pin outward of the pivoted bar, and a link pivotally connecting the swing-frame and the valve.

15. In a machine of the character described, the combination of a scale-beam, a pair of boxes pivotally carried by the beam having valve-controlled discharge ends, means whereby the leverage on the beam of the charged box over the uncharged box is decreased, means for charging the empty box until with its advantage of leverage it starts to descend and at the same time elevates the charged box, and means to open the valve of the charged box as it rises.

16. In a machine of the character described, the combination of a rocking beam, bearings for the same at opposite sides of its center and adapted to alternately form the fulcrum thereof and in the interim a joint-support therefor, boxes pivotally suspended from the beam outward of said bearings, and a weight to resist downward movement of the loaded box and after the same is weighed to rapidly move to a point where it will resist the downward movement of the companion box.

17. In a machine of the character described, the combination of a rocking beam, bearings for the same at opposite sides of its center and adapted to alternately form the fulcrum thereof and in the interim a joint-support therefor, boxes pivotally suspended from the beam outward of said bearings, a weight to resist downward movement of the loaded box and after the same is weighed to rapidly move to a point where it will resist the downward movement of the companion box, and means actuated by said weight while changing its position to cut off the supply of grain to the loaded box and direct it into the companion box.

18. In a machine of the character described, a rocking beam, bearings at opposite sides of the center of the same and adapted to alternately form the fulcrum thereof, a pair of boxes pivotally suspended from the beam at the outer sides of said bearings, and a weight adapted to travel from the higher to the lower end of the beam in the interim between the weighing of the boxes.

19. In a machine of the character described, a rocking beam, bearings at opposite sides of the center of the same and adapted to form alternately, fulcrums therefor, a pair of boxes pivotally suspended from the beam at the outer sides of said bearings, a weight adapted to travel from the higher to the lower end of the beam in the interim between the weighing of the boxes, and means actuated by the weight in changing its position, to cut off the supply to the weighted box and direct it into the companion box.

In testimony whereof I affix my signature in the presence of two witnesses.

MONROE DAVIS.

Witnesses:
H. C. RODGERS,
G. Y. THORPE.